INVENTOR.
Robert L. Allen
BY
Paul Fitzpatrick
ATTORNEY

Nov. 19, 1968  R. L. ALLEN  3,411,794
COOLED SEAL RING
Filed Dec. 12, 1966  2 Sheets-Sheet 2

INVENTOR.
Robert L. Allen
BY
Paul Fitzpatrick
ATTORNEY

United States Patent Office

3,411,794
Patented Nov. 19, 1968

3,411,794
COOLED SEAL RING
Robert L. Allen, Greenwood, Ind., assignor to General Motors Company, Detroit, Mich., a corporation of Delaware
Filed Dec. 12, 1966, Ser. No. 601,196
13 Claims. (Cl. 277—53)

ABSTRACT OF THE DISCLOSURE

A ring to cooperate with a labyrinth seal in a turbine or the like is made of a laminated porous material so that the ring is more readily abradable in the event of contact with the seal ridges and so that cooling air can be fed through the porous material to the gap between the two seal members.

---

My invention relates to porous metal structures and to a seal employing such structures. By employing porous metal as one element of a seal such as a labyrinth seal in a turbine, two benefits can be obtained. One is that, with a structure of controlled porosity, a controlled amount of cooling air can be supplied to the gap between the two members of the seal. The air thus introduced also may aid in the functioning of the seal to prevent leakage of turbine motive fluid. Secondly, the porous structure defines voids which reduce the stiffness and resistance to abrasion of the seal so that, in the event of interference between the relatively rotating parts of the seal, the porous structure may be worn away without damage to the engine.

The principal objects of my invention are to provide a porous material having a relatively open structure, to provide a porous material of controlled porosity, to provide such a material which is readily erodable, and to provide such material in which there are a number of sheets or laminae including an outer or sealing sheet which may be worn away and an inner sheet or sheets primarily controlling the flow of coolant through the material, so that abrasion or distortion of the sealing surface does not greatly affect the permeability of the structure.

Other objects of my invention and the nature and advantages thereof will be clear to those skilled in the art from the succeeding detailed description and accompanying drawings of preferred embodiments of the invention.

Figure 1:
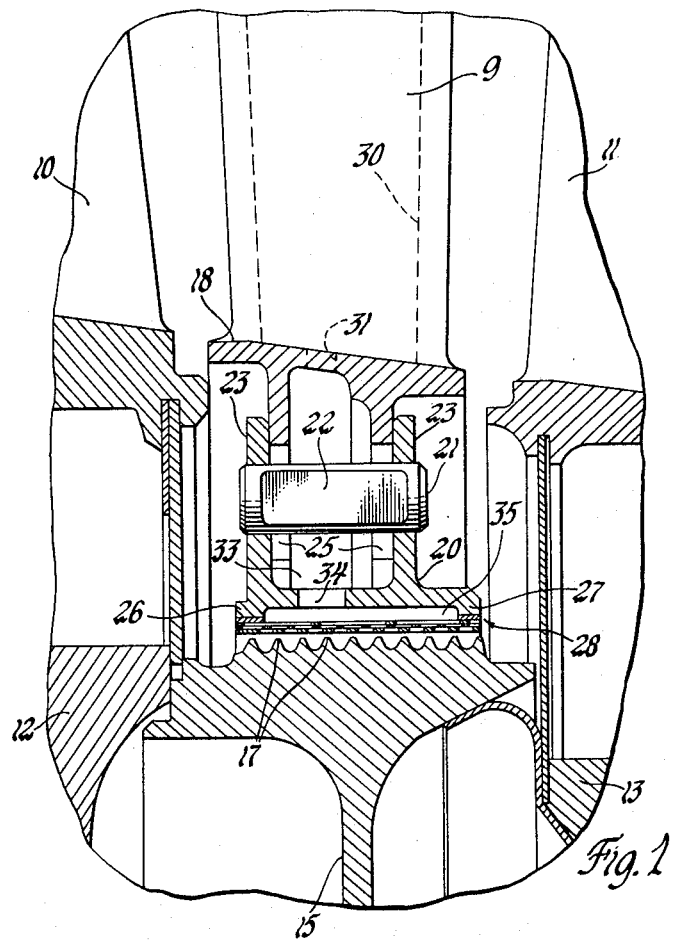
FIGURE 1 is a fragmentary sectional view of a gas turbine taken on a plane containing the axis of rotation of the turbine.

Referring first to FIGURE 1, the invention is illustrated as embodied in a labyrinth interstage seal in a high temperature turbine. The turbine structure shown is merely illustrative of a suitable environment for my invention and will be described only briefly. A ring of hollow turbine nozzle vanes 9 is disposed between moving blades 10 and 11 mounted on wheels 12 and 13 disposed before and behind the nozzle vanes 9, respectively. The motor includes a sealing ring or disk 15 mounted between the wheels 12 and 13 and bearing a number of labyrinth seal ridges or knives 17 on its outer surface. The nozzle vanes 9 are preferably set up as a number of segments, the vanes of each segment being connected by an outer shroud (not shown) and by an inner shroud 18. A seal support 20, which may be a complete circle or may be segmented, is supported on the inner shroud 18. The means of support comprises pins 21 having flats 22 on the lateral faces which are disposed in holes in flanges 23 of the seal ring and disposed in slots 25 in flanges extending radially inward from the shroud 18. This arrangement supports the ring 20 on the vane ring concentrically but with freedom for relative expansion, and facilitates engine assembly.

The seal support 20 has radially inwardly directed flanges 26 and 27 which support a facing 28 defining the outer ring of the labyrinth seal which cooperates with ridges 17 on the inner member 15 of the labyrinth seal. Air supplied from a suitable source (not illustrated) to the outer ends of vanes 9 flows through the passage 30 extending spanwise through the interior of the vanes and through holes 31 in the inner shroud 18 to the cooling air plenum 33 defined between the shroud 18 and the seal support 20. This cooling air is then discharged through a number of openings 34 in the seal support to the space 35 between the seal support and the seal ring 28. From space 35 the air flows through the porous or foraminous seal strip 28 and into the gap between the two elements of the labyrinth seal.

Figure 2:
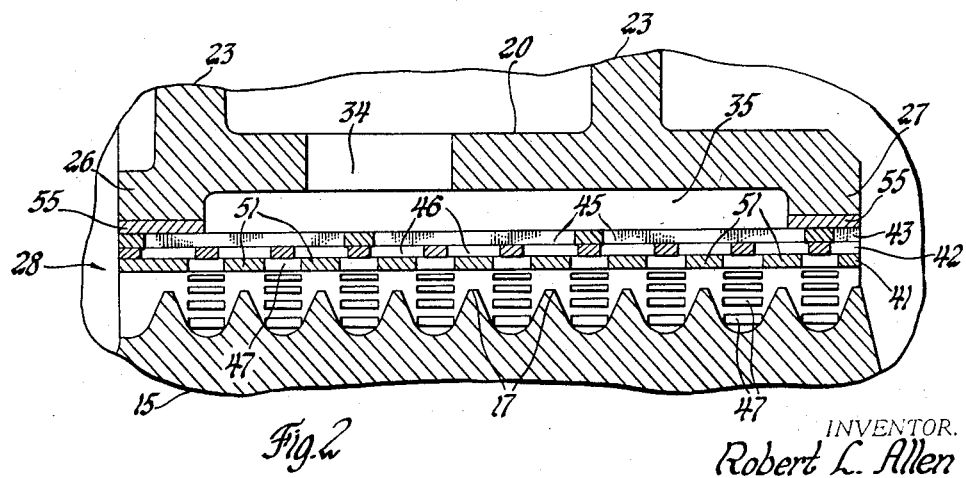
FIGURE 2 is an enlargement of a portion of FIGURE 1.

The strip 28 is a laminated metal structure characterized by a more or less openwork or grid type of structure of the sheets or laminae. The type of seal strip 28 shown in FIGURE 2 is shown also in FIGURES 4 and 5. It comprises an outer or face sheet 41 which is adjacent to the rotor 15, an intermediate layer 42, and an inner layer 43 which is the radially outer layer in the environment shown. The air supplied, through the vanes or otherwise, flows first through openings of predetermined size 45 in the inner sheet then through the overlap between these openings and openings 46 in the intermediate sheet and finally through the overlap between openings 46 and openings 47 in the outer sheet and on through the openings 47 into the seal gap. There is, of course, a great deal of latitude in the arrangement of the holes such as 45, 46, and 47.

Figure 3:
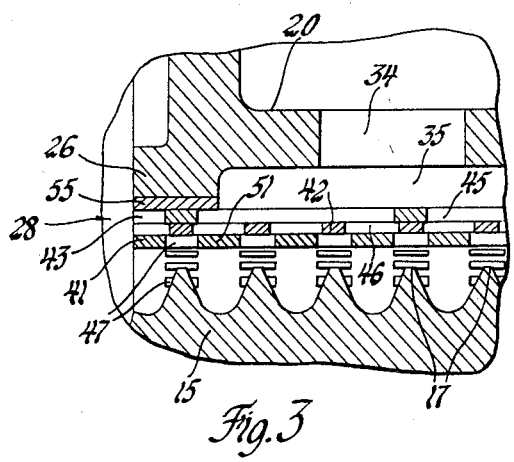
FIGURE 3 is a fragmentary view similar to FIGURE 2 of a modification.
Figure 4:
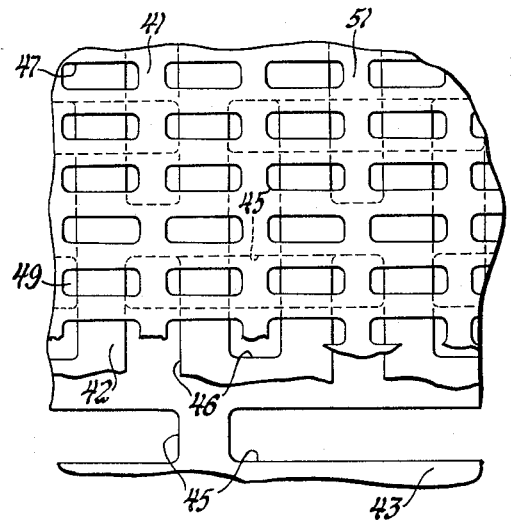
FIGURE 4 is a fragmentary view of a laminated permeable material.
Figure 5:
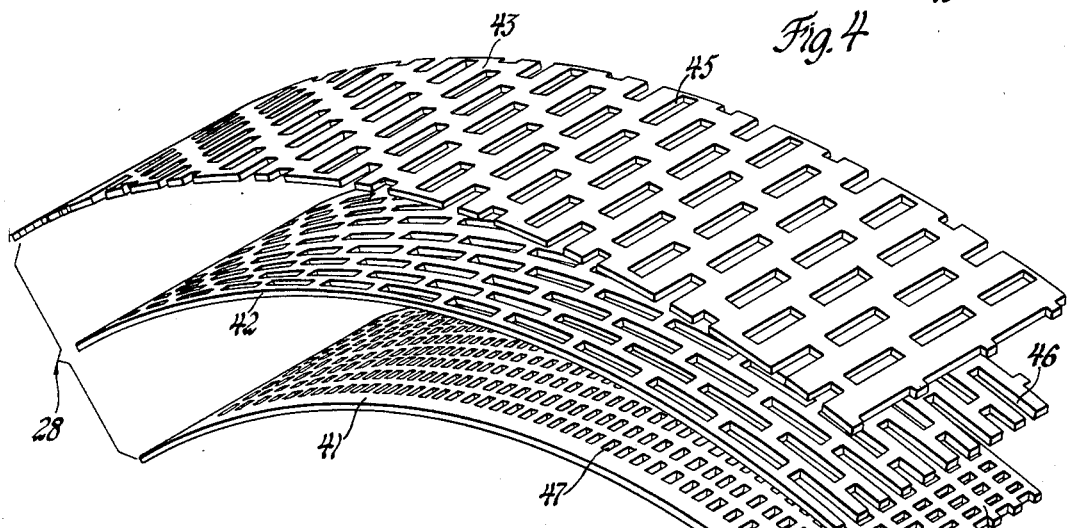
FIGURE 5 is an exploded axonometric view of the structure shown in FIGURE 2.

In the structure illustrated in FIGURES 4 and 5, the holes 45 are elongated transversely of the direction of movement of the seal knives, the holes 46 in the circumferential direction, and the holes 47 transversely of the seal knife movement. FIGURES 4 and 5 show the same sort of structure as that of FIGURES 2 and 3 but with slightly different proportions of the holes 47 in sheet 41. As is most clearly apparent from FIGURE 4, each hole 45 communicates with three of the holes 46 and each hole 46 communicates with ten holes 47. At certain points all three holes overlap as indicated, for example, at 49 in FIGURE 4. At other points flow to the holes 47 may take place from a hole 45 through the hole 46 circumferentially of the seal where the outlet hole 47 does not overlap the inlet hole 45. The holes 47 are preferably in a rectilinear or grid pattern, leaving bars 51 extending circumferentially of the seal between the circumferential rows of holes. The spacing of bars 51 is preferably the same as that of seal knives 17 so that the alignment of the bars 51 and holes 47 with respect to the seal knives is the same across the axial width of the seal.

The structures shown in FIGURES 2 and 3 differ in that they typify two approaches to this matter of alignment. In FIGURE 2, the bars or strips 51 overlie the seal knives. In FIGURE 3, the holes 47 overlie the seal knives. In the first case, the sealing tends to be more effective, but the abradability is less. In the second case, since the knives operate over the row of holes, the abradability is improved; but there is some tendency for flow to bypass the knives through the fixed structure of the seal strip. Depending upon circumstances, one or the other structure might be preferred.

While there is nothing critical about them, some dimensions preferred for the type of structures illustrated may be informative. The seal knives are from 0.08 to 0.11 of an inch apart and about 0.005 to 0.015 inch wide at the crest. The several layers 41, 42, and 43 are preferably about 0.01 inch thick. The overall seal strip 28 is preferably something like fifty percent solid metal and fifty percent holes for good abradability. Any desired degree of permeability to air flow can be obtained with any chosen value of solidity by varying the nature of the overlap between the holes. The seal strip preferably is manufactured by forming the holes in the separate sheets by some suitable process such as photoetching and then uniting the sheets by a suitable process such as diffusion bonding. In the course of the manufacture of the seal strip, it may often be desirable to include a brazing strip or sheet 55 on the inner surface of the strip where it mounts against the support 20. The facing 28 is preferably mounted on the support by welding or high temperature brazing, and the brazing strip 55 isolates the porous sheets from the braze metal.

It will be noted that considerable penetration of the outer and intermediate sheets of the seal strips by the seal knives may be made without greatly affecting the permeability of the seal strip, since the air is primarily metered by holes 45 or by these holes and their overlap with holes 46.

Figure 6:
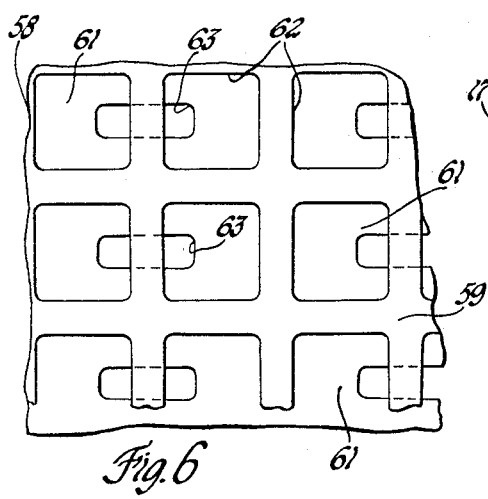
FIGURE 6 is a fragmentary view of a second form of premeable material.

FIGURE 6 illustrates a simplified structure in which the seal strip 58 comprises only two layers, an outer or sealing layer 59 and an inner or metering layer 61. The outer layer is provided with a rectilinear pattern of holes 62 and the inner layer has a rectilinear pattern of holes 63 which partially overlap the holes 62. Here the metering of air is dependent upon the overlap between the holes in the two sets of sheets and, as will be apparent, the area of the overlap is much smaller than the area cut out of the front sheet 59 to improve its abradability.

The supply of air into the seal in any form may be localized to some extent; for example, the seal strip may be pervious only toward the high pressure edge of the seal, the cooling air fed into the seal adjacent the high pressure edge flowing with any seal leakage air or gas to the low pressure side. The total flow of air may be metered or determined solely by the permeability of the seal strip or it may depend to some extent upon some other factors. For example, holes 31 could be calibrated to control the cooling air flow, to a greater or lesser degree.

In the operation of the engine, the air supplied through vanes 9 cools these vanes and the inner shrouds to some extent and finally escapes through the seals to cool also the rim of sealing disk 15 and the parts of the labyrinth seal. The air entering the seal may in some cases serve as a barrier against passage of a gas through the seal from the high pressure to the low pressure side.

The seal structure is not limited to any particular application, and may be used in various labyrinth seals in various locations.

The description of the preferred embodiments of the invention for the purpose of explaining the principles thereof is not to be considered as limiting or restricting the invention, since many modificatons may be made by the exercise of skill in the art.

I claim:

1. A porous laminated metal sheet comprising, in combination, a front metal lamina having holes distributed over the area of the lamina, the holes reducing the stiffness and resistance to abrasion of the lamina, and a metal lamina underlying the front lamina and having openings therein distributed over the area of the lamina, the said holes and openings defining pores extending through the sheet, the openings being disposed so as to partially overlap the holes to provide passages through the sheet of size determined by the area of overlap for flow of a fluid, the laminae being bonded together to form the sheet.

2. A sheet as recited in claim 1 in which the total volume of the pores is approximately equal to the volume of the metal.

3. A sheet as recited in claim 1 including also a rear lamina bonded with the said underlying lamina, the third lamina having perforations overlapping with the said openings.

4. A sheet as recited in claim 3 in which the holes, openings, and perforations all register to the extent that spaced passages directly through the sheet are provided.

5. A sheet as recited in claim 3 in which the openings are elongated in one direction and the perforations are elongated in a transverse direction.

6. A sheet as recited in claim 1 in which the holes are in a rectilinear grid pattern.

7. A labyrinth seal comprising, in combination, a first annular member bearing labyrinth seal ridges extending circumferentially of the member, a second annular member disposed adjacent to the first, the members being relatively rotatable, the second member including a foraminous facing having pores extending through the facing from surface to surface thereof and distributed over the facing, the front surface of the facing cooperating with the first member to define a labyrinth seal, and means for conducting a fluid to the rear surface of the facing for flow through the pores in the facing into the gap between the members.

8. A seal as recited in claim 7 in which the facing is a laminate of two or more porous sheets.

9. A seal as recited in claim 8 in which the total volume of the pores in the facing is approximately equal to the volume of the metal in the facing.

10. A seal as recited in claim 7 in which the facing comprises a front lamina having holes distributed over the area of the facing and a rear lamina underlying the front lamina and having openings therein distributed over the area of the lamina, the holes and openings registering partially so as to provide passages of predetermined area through the facing for the fluid.

11. A seal as recited in claim 10 including also a rear lamina bonded with the said underlying lamina, the third lamina having perforations overlapping with the said openings.

12. A seal as recited in claim 7 in which the facing defines rows of pores extending circumferentially of the seal and in which the outlets from the rows of pores are disposed between the seal ridges.

13. A seal as recited in claim 7 in which the facing defines rows of pores extending circumferentially of the seal and in which the outlets from the rows of pores are aligned with the seal ridges.

References Cited

UNITED STATES PATENTS

| 2,870,700 | 1/1959 | Harrington | 161—112 |
| 2,963,268 | 12/1960 | Smile et al. | 277—53 |

FOREIGN PATENTS

| 1,300,449 | 6/1962 | France. | |

SAMUEL ROTHBERG, *Primary Examiner.*